United States Patent
Ferrari et al.

(10) Patent No.: US 9,415,375 B2
(45) Date of Patent: Aug. 16, 2016

(54) CATALYST COMPOSITIONS FOR PRODUCING MIXED ALCOHOLS

(75) Inventors: Daniela Ferrari, Antwerp (BE); Neelesh J. Rane, Terneuzen (NL); Adam Chojecki, Gent (BE); Gerolamo Budroni, Terneuzen (NL); David G. Barton, Midland, MI (US); Mark H. McAdon, Midland, MI (US); Robert J. Gulotty, Jr., Midland, MI (US); Dean M. Millar, Midland, MI (US); Palanichamy Manikandan, Pune, IN (US)

(73) Assignee: Dow Global Technologies LLC, Midland, MI (US)

( * ) Notice: Subject to any disclaimer, the term of this patent is extended or adjusted under 35 U.S.C. 154(b) by 964 days.

(21) Appl. No.: 13/639,105

(22) PCT Filed: Mar. 30, 2011

(86) PCT No.: PCT/US2011/000566
§ 371 (c)(1),
(2), (4) Date: Oct. 3, 2012

(87) PCT Pub. No.: WO2011/126545
PCT Pub. Date: Oct. 13, 2011

(65) Prior Publication Data
US 2013/0029841 A1    Jan. 31, 2013

Related U.S. Application Data

(60) Provisional application No. 61/322,650, filed on Apr. 9, 2010.

(51) Int. Cl.
| | | |
|---|---|---|
| *B01J 23/00* | (2006.01) | |
| *B01J 23/648* | (2006.01) | |
| *B01J 23/652* | (2006.01) | |
| *B01J 23/656* | (2006.01) | |
| *B01J 37/02* | (2006.01) | |
| *B01J 21/04* | (2006.01) | |

(52) U.S. Cl.
CPC ............ *B01J 23/6482* (2013.01); *B01J 23/002* (2013.01); *B01J 23/6525* (2013.01); *B01J 23/6562* (2013.01); *B01J 23/6567* (2013.01); *B01J 37/0205* (2013.01); *B01J 21/04* (2013.01); *B01J 2523/00* (2013.01)

(58) Field of Classification Search
CPC ............... B01J 2523/00; B01J 2523/13; B01J 2523/14; B01J 2523/15; B01J 2523/47; B01J 2523/49; B01J 2523/11; B01J 2523/12; B01J 2523/828; B01J 2523/69; B01J 2523/55; B01J 2523/68; B01J 2523/74; B01J 2523/827; B01J 2523/48; B01J 2523/824; B01J 37/0205; B01J 21/04; B01J 23/002; B01J 23/6482; B01J 23/6525; B01J 23/6562; B01J 23/65767; B01J 23/652; B01J 23/656; B01J 23/00
See application file for complete search history.

(56) References Cited

U.S. PATENT DOCUMENTS

| | | |
|---|---|---|
| 4,096,164 A | 6/1978 | Ellgen et al. |
| 4,199,522 A | 4/1980 | Murchison et al. |
| 4,831,060 A * | 5/1989 | Stevens .................... B01J 23/85 502/219 |
| 6,333,444 B1 | 12/2001 | Ellis et al. |
| 2003/0204111 A1 | 10/2003 | Chaturvedi et al. |
| 2006/0009537 A1 | 1/2006 | Iordache-Cazana et al. |
| 2009/0018371 A1 | 1/2009 | Klepper et al. |
| 2009/0018372 A1 | 1/2009 | Tirmizi et al. |
| 2011/0107663 A1* | 5/2011 | Tirmizi .................. C10G 45/02 44/451 |

FOREIGN PATENT DOCUMENTS

| | | | |
|---|---|---|---|
| CN | 1175479 | 3/1998 | |
| CN | 1179993 | 4/1998 | |
| CN | 100335170 | 9/2007 | |
| CN | 100374200 | 3/2008 | |
| CN | 101185895 | 5/2008 | |
| EP | 0030110 | 6/1981 | |
| EP | 1043064 | 10/2000 | |
| GB | 2151616 | 7/1985 | |
| WO | 99/51339 | 10/1999 | |
| WO | WO2009/063120 | * 5/2009 | ............... B01J 23/16 |
| WO | 2011053953 | 5/2011 | |

OTHER PUBLICATIONS

International Search Report and Written Opinion from related PCT application PCT/US2011/000566 dated Jul. 5, 2011, 11 pages.
George, M.W., "Platinum-Group Metals", U.S. Geological Survey, Mineral Commodity Summaries, 2008, http://minerals.usgs.gov/minerals/pubs/commodity/platinum/mcs-2008-plati.pdf, 126-127.
Inoue, et al., "Alcohol synthesis from syngas on alumina-supported iridium-based catalysts" Effects of transition-metal compound additives, Applied Catalysis 67, 1991, 203-214.
Inoue, et al., "Alcohol Synthesis from Syngas on Group VIII Metal Catalysts Promoted by Mo—Na2O", Applied Catalysis 49, 1989, 213-217.
Inoue, et al., "Preparation of Ir—Mo—Na2O Composite Catalysts and Their Performances for Alcohol Synthesis From Syngas", Applied Catalysis 29, 1987, 361-374.
Matsumoto, et al., "Catalytic hydrogenation of carbon monoxide over silica-supported Ir—Mo—Rh catalyst", Catalysis Letters 24, 1994, 391-394.
Spivey, et al., "Heterogeneous catalytic synthesis of ethanol from biomass-derived syngas", Chem. Soc. Rev., 36, 2007, 1514-1528.
International Preliminary Report on Patentability from related PCT application PCT/US2011/000566 dated Oct. 18, 2012, 7 pages.

* cited by examiner

Primary Examiner — Melvin C Mayes
Assistant Examiner — Smita Patel
(74) Attorney, Agent, or Firm — Brooks, Cameron & Huebsch, PLLC

(57) ABSTRACT

Catalyst compositions for producing mixed alcohols from a synthesis gas feed. The catalyst composition comprises a catalytic metal combination on a catalyst support, a first optional promoter and a second optional promoter, where the catalytic metal combination consists essentially of iridium, vanadium, and molybdenum.

5 Claims, No Drawings

CATALYST COMPOSITIONS FOR PRODUCING MIXED ALCOHOLS

This application is a National Stage application under 35 U.S.C. 371 of PCT/US2011/000566, filed on Mar. 30, 2011 and published as WO2011/126545 A1 on Oct. 13, 2011, which claims the benefit of U.S. Provisional Application Ser. No. 61/322,650 filed Apr. 9, 2010, the entire contents of which are incorporated herein by reference in its entirety.

This application relates to catalyst compositions for production of mixed alcohols from a synthesis gas (syngas) feed, and in particular, producing mixed alcohols from catalyst compositions that include a catalytic metal combination that consists essentially of vanadium (V), iridium (Ir), and molybdenum (Mo).

Syngas can be produced from feedstocks such as coal, methane, biomass, or municipal waste. Syngas is a gas mixture that consists primarily of hydrogen ($H_2$), carbon monoxide (CO), and very often some carbon dioxide ($CO_2$). Syngas is used in the commercial production of synthetic natural gas, ammonia, methanol, and synthetic petroleum.

Syngas can also be used to produce mixed alcohols. Mixed alcohols consist primarily of methanol, ethanol, and n-propanol, along with a mixture of other minor compounds such as isopropanol, n-butanol, isobutanol, dimethyl ether, and acetaldehyde. Mixed alcohols are desirable because they can be used for the production of olefin monomers, e.g., ethylene and propylene. Specifically, ethanol and n-propanol (herein referred to as "prime alcohols") are the most desired alcohol targets because they can be dehydrated to ethylene and propylene, respectively. Production of mixed alcohols from syngas also produces hydrocarbons such as methane and ethane that are less desired than the prime alcohols. In addition, methanol is less desired than ethanol or n-propanol.

U.S. Pat. No. 4,096,164 (Ellgen et al.) provides a solid catalyst composition comprising rhodium (Rh) in combination with tungsten (W), Mo or both W and Mo, on a support material such as silica gel ($SiO_2$), graphite, graphitized carbon, alpha-alumina ($\alpha$-$Al_2O_3$), manganese oxides, magnesia (MgO), eta-alumina ($\eta$-$Al_2O_3$), gamma-alumina ($\gamma$-$Al_2O_3$), active carbon, and zeolitic molecular sieves.

Chinese Patent publication (CN) 1074304 (Luo et al., Dalian Institute) provides syngas conversion catalyst compositions based upon Rh, V and a metal selected from ruthenium (Ru), iron (Fe), Ir, Mo, manganese (Mn), potassium (K), lithium (Li) and copper (Cu) on a $SiO_2$ support.

United States Patent Application Publication (US) 2006/00009537 (Iordache-Cazana et al.) provides a catalyst composition that may be a solid comprising (a) an active metal selected from palladium (Pd), platinum (Pt), Rh, osmium (Os) and Ir, (b) a mixed metal component comprising one or more of (i) a metal A selected from lanthanum (La), cerium (Ce) and samarium (Sm), and (ii) a metal B selected from titanium (Ti), zirconium (Zr), and hafnium (Hf), and (c) a promoter selected from Li, sodium (Na), K, rubidium (Rb), cesium (Cs) and francium (Fr).

British Patent (GB) 2,151,616 (S. L. Jackson) provides syngas conversion catalyst compositions comprising a Group VIII metal such as Fe, cobalt (Co), nickel (Ni), Ru, Rh, Pd, Os, Ir or Pt on a tungsten oxide or molybdenum oxide support.

Matsumoto et al., Catalysis Letters, 24 (1994), 391-394 reports that Rh—Ir—Mo catalyst metals on a $SiO_2$ support (Rh—Ir—Mo//$SiO_2$) gives much higher activity than Ir—Mo//$SiO_2$.

Inoue et al., Applied Catalysis, 49 (1989), 213-217, Applied Catalysis 67 (1991), 203-214, and Applied Catalysis 29 (1987), 361-374 reports that for alcohol synthesis catalyst activity at 255° C. decreases in order as Rh>Ir>Ru>Pd>Ni>Pt>Cu>Co>rhenium (Re)>Fe for metal catalysts promoted by Mo and Na and supported on alumina. The best Ir-based catalyst reported is an alumina-supported Ir—Mo—$Na_2O$ (sodium oxide) catalyst composition, and gives approximately 8% selectivity to prime, alcohols on a carbon atom basis.

The disclosed catalyst compositions comprise a catalytic metal combination on a catalyst support, a first optional promoter, and a second optional promoter. The catalytic metal combination consists essentially of Ir, V, and Mo. The disclosed catalyst compositions have a comparable or higher catalyst activity and selectivity to prime alcohols, as compared to other catalyst compositions not including the catalytic metal combination Ir—V—Mo.

The disclosed catalyst compositions have utility in conversion of syngas gas to mixed alcohols, and in particular to produce prime alcohols, i.e., ethanol and n-propanol, with a selectivity of greater than 10% on a carbon atom basis. These Ir-based catalyst compositions give performance that is comparable to Rh-based catalysts. Obtaining comparable results is advantageous because the price history favors Ir over Rh. For example, 2007 prices for Ir and Rh were 440 and 6060 United States dollars per troy ounce (USD/ozt), respectively (George, M. W., "Platinum-Group Metals" U.S. Geological Survey, Mineral Commodity Summaries (2008), access online at: http://minerals.usgs.gov/minerals/pubs/commodity/platinum/mcs-2008-plati.pdf on Mar. 16, 2010).

The disclosed catalyst compositions do not contain Rh and provide selectivity to prime alcohols on a carbon atom basis that is greater than 10%, and preferably within a range of from 15% to 20% for CO conversions between 20% and 40%. These results are unexpected because it is generally accepted that Ir is much less active than metals such as Rh or Fischer-Tropsch metals, e.g., Fe, Co, and Ru. In addition, the disclosed catalytic metal combination provides improved selectivity to prime alcohols as compared to other catalytic metal combinations of Ir, V, and Mo, such as Ir—V, Ir—Mo, and V—Mo. For example, the Inoue article discussed above reports approximately 8% selectivity to prime alcohols for the Ir—Mo—$Na_2O$//$Al_2O_3$ catalyst. The disclosed catalyst compositions are advantageous because they provide selectivity to prime alcohols greater than 10% while also reducing the cost for the catalyst composition by not using Rh in the catalyst composition.

In some aspects, this invention is a catalyst composition for converting syngas to mixed alcohols. The disclosed catalyst composition is represented by the following:

$$Ir_a, V_b, Mo_c, P1_d, P2_e//Q$$

where P1 is an optional first promoter that is selected from the group consisting of Zr, Re, Pd, Hf, Mn, W, and combinations thereof; P2 is an optional second promoter that is selected from the group consisting of K, Li, Na, Rb, Cs, and combinations thereof; Q is a catalyst support selected from the group consisting of $\alpha$-alumina, $\gamma$-alumina, delta-alumina ($\delta$-$Al_2O_3$), MgO, $SiO_2$, zirconia, zinc oxide, titania, ceria, magnesium aluminates, magnesium silicates, niobium pentaoxide ($Nb_2O_5$), or neodymium oxide ($Nd_2O_3$) and combinations thereof; and the variables a, b, c, d, and e are real numbers that specify the amounts of Ir, V, Mo, P1, and P2, respectively, that are impregnated onto the catalyst support Q in units of millimoles per hectogram of support (mmol/hg). The preferred catalyst supports are $\alpha$-$Al_2O_3$ and $\delta$-$Al_2O_3$.

Catalyst preparation may occur via known techniques such as aqueous deposition-precipitation, non-aqueous incipient wetness impregnation, or aqueous incipient wetness impregnation. Incipient wetness impregnation using aqueous solutions that contain the catalytic metals as inorganic salts is preferred.

The catalyst support is impregnated with a soluble source of the catalytic metal combination consisting essentially of V, Ir, and Mo. The catalytic metal combination includes Ir in an amount within a range of from 1 mmol/hg to 65 mmol/hg, V in an amount within a range of from 2 mmol/hg to 80 mmol/hg, and Mo in an amount within a range of from 3 mmol/hg to 85 mmol/hg, each mmol/hg based on a mass of the catalyst support prior to the addition of the catalytic metal combination, the first optional promoter, and second optional promoter.

The preferred first optional promoters are Zr, Re, and Pd. The catalyst support can be impregnated with a soluble source Zr, Re, and Pd, alone or in combination with one another. The first optional promoter includes at least one of Zr in an amount within a range of from 2.0 mmol/hg to 80.0 mmol/hg, Re in an amount within a range of from 2.0 mmol/hg to 80.0 mmol/hg, and Pd in an amount within a range of 0.2 mmol/hg to 5.0 mmol/hg, based on the mass of catalyst support prior to being impregnated with the catalytic metal combination, the first optional promoter, and the second optional promoter.

The preferred second optional promoter is K. The catalyst support can be impregnated with a soluble source of K. The second optional promoter includes K in an amount within a range of from 1 mmol/hg to 500 mmol/hg, based on the mass of catalyst support prior to being impregnated with the catalytic metal combination, the first optional promoter, and the second optional promoter.

EXAMPLE (EX) 1

Impregnation method: for Ex 1 (and also for Exs 2-7 and Comparative Examples (CExs) A and K), impregnate the catalyst support by wetting (dropwise) the catalyst support and mechanically shake, within a glass synthesis tube (12 milliliters (mL) volume), and stir mechanically with a metal whisk.

Choose an $\alpha$-$Al_2O_3$ catalyst support with an incipient wetness pore volume of 0.5-0.6 cubic centimeter per gram (cc/g) when crushed and sized. Crush the $\alpha$-$Al_2O_3$ catalyst support and sieve it to a 40-80 mesh size (425 micrometer ($\mu$m)-180 $\mu$m). Transfer 450.0 milligrams (mg) to the glass synthesis tube. Dissolve 12.15 mg of oxalic acid ($H_2C_2O_4$) in 638.0 mg deionized water (DIW). Add 8.95 mg of ammonium metavanadate ($NH_4VO_3$) and stir until dissolved. Impregnate the $\alpha$-$Al_2O_3$ support with 270.0 microliters ($\mu$L) of the $NH_4VO_3$ dissolved solution. Calcine to 350 degrees Celsius (° C.) in static air for 10 hours (hrs) with a 5° C./minute (min) heating rate. Impregnate a second time with 270.0 $\mu$L of the $NH_4VO_3$ dissolved solution, and calcine the material again at 350° C. in a static air for 10 hrs with a 5° C./min heating rate.

Dissolve 11.86 mg ammonium hexachloroiridate (($NH_4$)$_2$$IrCl_6$) in 258 mg aqueous ammonium hydroxide ($NH_4OH$, 29 weight percent (wt %)). Impregnate the sample with the full amount of the ($NH_4$)$_2$$IrCl_6$ dissolved solution, and dry for 10 hrs at 120° C. Prepare and impregnate a second allotment of this ($NH_4$)$_2$$IrCl_6$ dissolved solution, and dry again for 10 hrs at 120° C. Dissolve 12.58 mg ammonium heptamolybdate tetrahydrate (($NH_4$)$_6$$Mo_7O_{24}$.$4H_2O$) in 265 mg DIW, impregnate the $\alpha$-$Al_2O_3$ catalyst support with the full amount of this dissolved solution, and dry for 10 hrs at 120° C. Dissolve 2.04 mg potassium nitrate ($KNO_3$) in 269 mg DIW, impregnate the $\alpha$-$Al_2O_3$ catalyst support with the full amount of this dissolved solution, and dry for 10 hrs at 120° C. Calcine in air by heating at a rate of 5° C./min to 450° C., hold for 10 hrs at 450°

C., and allow the sample to cool to room temperature. The catalyst composition is Ir 11.7, V 14.0, Mo 15.5, K 3.8//$\alpha$-$Al_2O_3$, where the numbers give metal impregnation loadings in units of mmol/hg of catalyst support.

Load 200 $\mu$L of the catalyst composition sample into a 0.4 centimeter (cm) diameter quartz reactor. At a pressure of 9.31 megapascals (MPa), pass $H_2$ gas through the catalyst composition sample at a flow rate of 20.8 standard cubic centimeters per minute (sccm; defined at 0° C. and 0.101325 MPa) and heat the reactor to 350° C. with a ramp of 2° C./min and maintain for 180 min. Cool the catalyst to 270° C. and pass a syngas feed stream composed of 45 volume percent (vol %) $H_2$, 45 vol % CO, 10 vol % nitrogen gas ($N_2$) through the catalyst sample at a flow rate of 20.8 sccm at 9.31 MPa.

Analyze reactor effluent via gas chromatography (GC) to determine product composition and CO conversion. Raise the reactor temperature to 300° C., 320° C., and 340° C. at a rate of 2° C./min, holding reactor at each temperature for 11 hrs to measure catalyst performance at a given temperature.

EX 2

Replicate Ex 1, but add one impregnation prior to the $KNO_3$ impregnation. Dissolve 21.5 mg zirconyl nitrate hydrate ($ZrO(NO_3)_2$.$H_2O$) in 255 mg DIW, impregnate the $\alpha$-$Al_2O_3$ catalyst support with the full amount of this dissolved solution, and dry for 10 hrs at 120° C. The catalyst composition is Ir 11.7, V 14.0, Mo 15.5, Zr 19.4, K 3.8//$\alpha$-$Al_2O_3$.

EX 3

Replicate Ex 1, but add two impregnations after the $KNO_3$ impregnation and prior to the calcination, as follows. Dissolve 10.85 mg ammonium perrhenate ($NH_4ReO_4$) in 267 mg DIW, impregnate the $\alpha$-$Al_2O_3$ catalyst support with the full amount of this dissolved solution, and dry for 10 hrs at 120° C. Repeat this impregnation, and dry for 10 hrs at 120° C. The catalyst composition is Ir 11.7, V 14.0, Mo 15.5, Re 17.8, K 3.8//$\alpha$-$Al_2O_3$.

EX 4

Replicate Ex 2, but add one impregnation after the $KNO_3$ impregnation and prior to calcination. Dissolve 0.964 mg palladium nitrate ($Pd(NO_3)_2$) in 270 mg DIW, impregnate the $\alpha$-$Al_2O_3$ catalyst support with the full amount of this dissolved solution, and dry for 10 hrs at 120° C. The catalyst composition is Ir 11.7, V 14.0, Mo 15.5, Zr 19.4, Pd 0.9, K 3.8//$\alpha$-$Al_2O_3$.

EX 5

Replicate Ex 3, but change both impregnations with $NH_4ReO_4$ to 5.42 mg $NH_4ReO_4$ in 269 mg DIW. Also, prior to the $KNO_3$ impregnation, dissolve 10.75 mg ZrO$(NO_3)_2$.$H_2O$ in 262 mg DIW, impregnate the $\alpha$-$Al_2O_3$ catalyst support with the full amount of this dissolved solution, and dry for 10 hrs at 120° C. The catalyst composition is Ir 11.7, V 14.0, Mo 15.5, Zr 9.7, Re 8.9, K 3.8//$\alpha$-$Al_2O_3$.

EX 6

Replicate Ex 3, but add one impregnation prior to the $KNO_3$ impregnation. Dissolve 21.5 mg $ZrO(NO_3)_2$.$H_2O$ in 255 mg DIW, impregnate the $\alpha$-$Al_2O_3$ catalyst support with the full amount of this dissolved solution, and dry for 10 hrs at 120° C. The catalyst composition is Ir 11.7, V 14.0, Mo 15.5, Zr 19.4, Re 17.8, K 3.8//α-$Al_2O_3$.

EX 7

Use the method of Ex 1, but impregnate as follows: dissolve 3.61 mg of $H_2C_2O_4$ in 263 mg DIW, add 2.66 mg of $NH_4VO_3$, and stir until dissolved. Impregnate the α-$Al_2O_3$ catalyst support with the full amount of the $NH_4VO_3$ dissolved solution. Calcine to 350° C. in static air for 10 hrs with a 5° C./min heating rate. Repeat this $NH_4VO_3$ impregnation, and calcine the material again at 350° C. in a static air for 10 hrs with a 5° C./min heating rate.

Dissolve 11.86 mg $(NH_4)_2IrCl_6$ in 258 mg aqueous ammonium hydroxide ($NH_4OH$, 29 wt %). Impregnate the sample with the full amount of the $(NH_4)_2IrCl_6$ dissolved solution, and dry for 10 hrs at 120° C. Do not repeat this impregnation. Dissolve 12.96 mg $(NH_4)_6Mo_7O_{24}.4H_2O$ in 256 mg DIW, impregnate the sample with the full amount of this dissolved solution, and dry for 10 hrs at 120° C. Dissolve 11.07 ZrO$(NO_3)_2.H_2O$, 8.86 mg $NH_4ReO_4$, and 1.85 mg $KNO_3$ in 248 mg DIW, impregnate the sample with the full amount of this dissolved solution, and dry for 10 hrs at 120° C. Calcine in air by heating at a rate of 5° C./min to 450° C., hold for 10 hrs at 450° C., and allow the sample to cool to 25° C. The catalyst composition is Ir 5.9, V 10.0, Mo 16.0, Zr 10.0, Re 7.3, K 3.5//α-$Al_2O_3$.

EX 8

Use an incipient wetness impregnation method that differs from Ex 1. Impregnation method: for Ex 8 (and also for Exs 9-13 and CExs B-J), place the catalyst support into a glass synthesis vial (25 mL). Carry out each impregnation with four steps as follows: (a) add the aqueous solution to the vial, (b) mix manually with a lab spatula until the sample is homogeneous, (c) dry in air for 30 min. at 100° C., and (d) allow the sample to cool to 25° C.

Choose an α-$Al_2O_3$ catalyst support with an incipient wetness pore volume of 0.5-0.6 cc/g when crushed and sized. Crush the α-$Al_2O_3$ catalyst support and sieve it to a 20-40 mesh size (850 μm-425 μm). Transfer 2.90 g to the glass synthesis vial.

Add the following to a beaker with magnetic stirring: 2.9 mL DIW, 49 mg $NH_4VO_3$, and one drop of concentrated ammonium hydroxide ($NH_3$, 28-30 wt %). Stir until the solute is dissolved. Impregnate the prepared α-$Al_2O_3$ catalyst support with half of the $NH_4VO_3$ dissolved solution. Impregnate a second time with the remaining half of the $NH_4VO_3$ dissolved solution. Add the following to a beaker with magnetic stirring: 1.45 mL DIW, 83 mg $(NH_4)_6Mo_7O_{24}.4H_2O$, and stir until the solutes are dissolved. Impregnate the sample with this dissolved solution.

Empty the contents of the glass vial onto a ceramic dish, and place the dish into an air-purged furnace for calcination. Heat the sample at a rate of 2° C./min to 450° C., and hold at 450° C. for 4 hrs. Allow the sample to cool to 25° C., and then transfer to another glass vial.

Dissolve 117 mg of iridium chloride hydrate ($IrCl_4.H_2O$) in 1.45 mL water. Impregnate the sample with the full amount of this dissolved solution. Calcine in air by heating at a rate of 2° C./min to 450° C., and hold at 450° C. for 4 hrs, and allow the sample to cool to 25° C. The catalyst composition is Ir 12.0, V 14.0, Mo 16.0//α-$Al_2O_3$, where the numbers give metal impregnation loadings in units of mmol/hg of catalyst support.

Load 1.5 g of the catalyst composition in a 0.64 cm diameter stainless steel tube reactor heated in a sand-bath. Pass a gaseous feed stream composed of $H_2$ through the catalyst at a flow rate of 200 sccm and heat the sand bath to 330° C. with a ramp rate of 90° C./hr and hold for 4 hrs. Cool the sand bath to 270° C. and pass a gaseous feed stream composed of 47.5 vol % $H_2$, 47.5 vol % CO and 5 vol % $N_2$ through the catalyst at a flow rate of 300 sccm and raise the pressure to 1500 psi (10.34 MPa) using a pressure regulator on the reactor's outlet. Analyze effluent gas from the reactor via GC to determine product composition and amount of CO converted. Heat the sand bath to 300° C., 320° C., 340° C. and 360° C. at a rate of 60° C. per hour, holding the temperature at each setting for 8 hrs to allow measurement of catalyst performance at a given temperature using GC analysis.

EX 9

Replicate Ex 8, but change the $(NH_4)_6Mo_7O_{24}.4H_2O$ solution to include 83 mg $(NH_4)_6Mo_7O_{24}.4H_2O$ plus 16 mg $KNO_3$ dissolved in 1.45 mL DIW. The catalyst composition is Ir 12.0, V 14.0, Mo 16.0, K 5.5//α-$Al_2O_3$.

EX 10

Replicate Ex 8, but use 2.75 g α-$Al_2O_3$ catalyst support, prepare the $NH_4VO_3$ solution using 2.74 mL DIW, prepare the $(NH_4)_6Mo_7O_{24}.4H_2O$ solution to include 83 mg $(NH_4)_6Mo_7O_{24}.4H_2O$ plus 295 mg $KNO_3$ dissolved in 2.74 mL DIW, and prepare the $IrCl_4.H_2O$ solution with 1.37 mL DIW. The catalyst composition is Ir 13.0, V 15.0, Mo 17.0, K 106.0//α-$Al_2O_3$.

EX 11

Replicate Ex 8, but use 2.8 g δ-alumina with an incipient wetness pore volume of 0.7 cc/g, prepare the $NH_4VO_3$ solution using 3.8 mL DIW, prepare the $(NH_4)_6Mo_7O_{24}.4H_2O$ solution to include 83 mg $(NH_4)_6Mo_7O_{24}.4H_2O$ plus 295 mg $KNO_3$ dissolved in 1.9 mL DIW, and prepare the $IrCl_4H_2O$ solution with 1.9 mL DIW. The catalyst composition is Ir 13.0, V 15.0, Mo 17.0, K 104.0//δ-$Al_2O_3$.

EX 12

Replicate Ex 11, but use 2.7 g γ-alumina with an incipient wetness pore volume of 0.85 cc/g, prepare the NI-1$_4VO_3$ solution using 4.6 mL DIW, prepare the $(NH_4)_6Mo_7O_{24}.4H_2O$ solution to include 83 mg $(NH_4)_6Mo_7O_{24}.4H_2O$ plus 16 mg $KNO_3$ dissolved in 2.3 mL DIW, and prepare the $IrCl_4H_2O$ solution with 2.3 mL DIW. The catalyst composition is V 16.0, Ir 13.0, Mo 17.0, K 5.9//γ-$Al_2O_3$.

EX 13

Replicate Ex 12, but use 2.8 g γ-alumina, prepare the $NH_4VO_3$ solution using 4.8 mL DIW, prepare the $(NH_4)_6Mo_7O_{24}.4H_2O$ solution to include 83 mg $(NH_4)_6Mo_7O_{24}.4H_2O$ and 295 mg $KNO_3$ dissolved in 2.4 mL DIW, and prepare the $IrCl_4.H_2O$ solution with 2.4 mL DIW. The catalyst composition is V 15.0, Ir 13.0, Mo 17.0, K 104.0//γ-$Al_2O_3$.

CEx A

Replicate Ex 1, but do not impregnate with $(NH_4)_2IrCl_6$. The catalyst composition is V 14.0, Mo 15.5, K 3.8//$\alpha$-$Al_2O_3$.

CEx B

Replicate Ex 8, but do not impregnate with $NH_4VO_3$, prepare the $(NH_4)_6Mo_7O_{24} \cdot 4H_2O$ solution using 83 mg $(NH_4)_6Mo_7O_{24} \cdot 4H_2O$ and 1.45 mL DIW, and prepare the $IrCl_4H_2O$ solution using 117 mg $IrCl_4H_2O$ and 2.90 mL DIW. The catalyst composition is Ir 12.0, Mo 16.0//$\alpha$-$Al_2O_3$.

CEx C

Replicate Ex 8, but do not impregnate with $(NH_4)_2IrCl_6$, prepare the $NH_4VO_3$ using 49 mg $NH_4VO_3$ dissolved in 2.74 mL DIW and one drop of $NH_3$, prepare the $(NH_4)_6Mo_7O_{24} \cdot 4H_2O$ using 83 mg $(NH_4)_6Mo_7O_{24} \cdot 4H_2O$ and 16 mg $KNO_3$ dissolved in 2.74 mL DIW. The catalyst composition is V 14.0, Mo 16.0, K 5.5//$\alpha$-$Al_2O_3$.

CEx D

Replicate Ex 9, but do not impregnate with mg $(NH_4)_6Mo_7O_{24} \cdot 4H_2O$, use 49 mg $NH_4VO_3$, 16 mg $KNO_3$, and 117 mg $IrCl_4H_2O$. The catalyst composition is V 14.0, Ir 12.0, K 5.5//$\alpha$-$Al_2O_3$.

CEx E

Replicate Ex 9, but do not impregnate with $NE4VO_3$, use 83 mg $(NH_4)_6Mo_7O_{24} \cdot 4H_2O$, 16 mg $KNO_3$ and 117 mg $IrCl_4H_2O$. The catalyst composition is Ir 12.0, Mo 16.0, K 5.5//$\alpha$-$Al_2O_3$.

CEx F

Replicate Ex 8, but do not impregnate with $NH_4VO_3$, use 2.75 g $\alpha$-$Al_2O_3$, prepare the $(NH_4)_6Mo_7O_{24} \cdot 4H_2O$ solution using 305 mg $(NH_4)_6Mo_7O_{24} \cdot 4H_2O$ and 113 mg $NaNO_3$ dissolved in 2.74 mL DIW, and prepare the $IrCl_4H_2O$ solution using 173 mg $IrCl_4 \cdot H_2O$ dissolved in 1.37 mL DIW. The catalyst composition is Ir 19.0, Mo 63.0, Na 48.0//$\alpha$-$Al_2O_3$.

CEx G

Replicate Ex 8, but do not impregnate with $NH_4VO_3$, use 2.7 g $\alpha$-$Al_2O_3$, prepare the $(NH_4)_6Mo_7O_{24} \cdot 4H_2O$ using 304 mg $(NH_4)_6Mo_7O_{24} \cdot 4H_2O$ and 111 mg $NaNO_3$ dissolved in 2.7 mL DIW, and prepare the $IrCl_4 \cdot H_2O$ solution using 173 mg $IrCl_4H_2O$ dissolved in 2.7 mL DIW. The catalyst composition is Ir 19.0, Mo 64.0, Na 49.0//$\delta$-$Al_2O_3$.

CEx H

Replicate CEx F, but use 2.7 g $\delta$-alumina with an incipient wetness pore volume of 0.7 cc/g, prepare the $(NH_4)_6Mo_7O_{24} \cdot 4H_2O$ solution using 305 mg $(NH_4)_6Mo_7O_{24} \cdot 4H_2O$ and 113 mg $NaNO_3$ dissolved in 3.8 mL DIW, and prepare $IrCl_4 \cdot H_2O$ solution using 1.9 mL DWI. The catalyst composition is Ir 19.0, Mo 64.0, Na 49.0//$\delta$-$Al_2O_3$.

CEx I

Replicate Ex 8, but do not impregnate with $NH_4VO_3$, use 2.7 g $SiO_2$ (Davison 57) with an incipient wetness pore volume of 1.1 cc/g as the catalyst support, prepare the $(NH_4)_6Mo_7O_{24} \cdot 4H_2O$ solution using 196 mg $(NH_4)_6Mo_7O_{24} \cdot 4H_2O$ dissolved in 3.0 mL DIW, and prepare the $IrCl_4H_2O$ solution using 370 mg $IrCl_4H_2O$ dissolved in 3.0 mL DIW. The catalyst composition is Ir 41.0, Mo 41.0//$SiO_2$.

CEx J

Replicate CEx I, but prepare the $(NH_4)_6Mo_7O_{24} \cdot 4H_2O$ solution using 305 mg $(NH_4)_6Mo_7O_{24} \cdot 4H_2O$ and 113 mg $NaNO_3$ dissolved in 3.0 mL DIW, and prepare the $IrCl_4H_2O$ solution using 173 mg $IrCl_4H_2O$ dissolved in 3.0 mL DIW. The catalyst composition is Ir 19.0, Mo 64.0, Na 49.0//$SiO_2$.

CEx K

Synthesize CEx K using an incipient wetness impregnation method as described in Ex 1. Select a Davison 57 $SiO_2$ catalyst support with incipient wetness pore volume of 1.32 cc/g when crushed and sized to a 40-80 mesh size (425 μm-180 μm). Crush the $SiO_2$ catalyst support, sieve it to a 40-80 mesh size, and transfer 250 mg to a glass synthesis tube (12 mL). Dissolve 7.57 mg of $H_2C_2O_4$ and 5.63 mg of $NH_4VO_3$ in 316 mg DIW. Impregnate the prepared $SiO_2$ catalyst support with the entire amount of this solution, and then dry for 10 hrs at 120° C.

Dissolve 3.29 mg rhodium(III) chloride hydrate ($RhCl_3 \cdot H_2O$; 38 wt % Rh) and 0.835 mg $KNO_3$ in 325 mg DIW. Impregnate the sample with the entire amount of this solution, and dry for 8 hrs at 120° C. Dissolve 6.81 mg $(NH_4)_6Mo_7O_{24} \cdot 4H_2O$ in 323 mg DIW, impregnate the sample with the full amount of this dissolved solution, and dry for 8 hrs at 120° C. Calcine in air by heating at a rate of 5° C./min to 450° C., hold overnight at 450° C. (15 hrs total time), and allow the sample to cool to room temperature. The catalyst composition is Rh 4.9, V 19.0, Mo 15.1, K 2.8//$SiO_2$.

The contents of the impregnated metals in weight percent are 0.50 wt % Rh, 1.00 wt % V, 1.40 wt % Mo, and 0.11 wt % K. This composition falls within the teachings of CN 1074304 (Luo et al., Dalian Institute; 0.01-3% for Rh, 0.1-10% for V, and 0.01-10% for the other metals).

Table 1 provides the catalyst compositions of Exs 1-13 and CExs A-K.

TABLE 1

| | V | Ir | Mo | Rh | K | Zr | Re | Pd | Na | Support |
|---|---|---|---|---|---|---|---|---|---|---|
| | | | mmol/hg of support | | | | | | | |
| Ex 1 | 14.0 | 11.7 | 15.5 | — | 3.8 | — | — | — | — | $\alpha$-$Al_2O_3$ |
| Ex 2 | 14.0 | 11.7 | 15.5 | — | 3.8 | 19.4 | — | — | — | $\alpha$-$Al_2O_3$ |
| Ex 3 | 14.0 | 11.7 | 15.5 | — | 3.8 | — | 17.8 | — | — | $\alpha$-$Al_2O_3$ |
| Ex 4 | 14.0 | 11.7 | 15.5 | — | 3.8 | 19.4 | — | 0.9 | — | $\alpha$-$Al_2O_3$ |
| Ex 5 | 14.0 | 5.9 | 15.5 | — | 3.8 | 9.7 | 8.9 | — | — | $\alpha$-$Al_2O_3$ |
| Ex 6 | 14.0 | 11.7 | 15.5 | — | 3.8 | 19.4 | 17.8 | — | — | $\alpha$-$Al_2O_3$ |
| Ex 7 | 10.0 | 5.9 | 16.0 | — | 3.5 | 10.0 | 7.3 | — | — | $\alpha$-$Al_2O_3$ |
| Ex 8 | 14.0 | 12.0 | 16.0 | — | — | — | — | — | — | $\alpha$-$Al_2O_3$ |

TABLE 1-continued

| | V | Ir | Mo | Rh | K | Zr | Re | Pd | Na | Support |
|---|---|---|---|---|---|---|---|---|---|---|
| | | | mmol/hg of support | | | | | | | |
| Ex 9 | 14.0 | 12.0 | 16.0 | — | 5.5 | — | — | — | — | α-Al$_2$O$_3$ |
| Ex 10 | 15.0 | 13.0 | 17.0 | — | 106.0 | — | — | — | — | α-Al$_2$O$_3$ |
| Ex 11 | 15.0 | 13.0 | 17.0 | — | 104.0 | — | — | — | — | δ-Al$_2$O$_3$ |
| Ex 12 | 16.0 | 13.0 | 17.0 | — | 5.9 | — | — | — | — | γ-Al$_2$O$_3$ |
| Ex 13 | 15.0 | 13.0 | 17.0 | — | 104.0 | — | — | — | — | γ-Al$_2$O$_3$ |
| CEx A | 14.0 | — | 15.5 | — | 3.8 | — | — | — | — | α-Al$_2$O$_3$ |
| CEx B | — | 12.0 | 16.0 | — | — | — | — | — | — | α-Al$_2$O$_3$ |
| CEx C | 14.0 | — | 16.0 | — | 5.5 | — | — | — | — | α-Al$_2$O$_3$ |
| CEx D | 14.0 | 12.0 | — | — | 5.5 | — | — | — | — | α-Al$_2$O$_3$ |
| CEx E | — | 12.0 | 16.0 | — | 5.5 | — | — | — | — | α-Al$_2$O$_3$ |
| CEx F | — | 19.0 | 63.0 | — | — | — | — | — | 48.0 | α-Al$_2$O$_3$ |
| CEx G | — | 19.0 | 64.0 | — | — | — | — | — | 48.0 | α-Al$_2$O$_3$ |
| CEx H | — | 19.0 | 64.0 | — | — | — | — | — | 49.0 | δ-Al$_2$O$_3$ |
| CEx I | — | 41.0 | 41.0 | — | — | — | — | — | — | SiO$_2$ |
| CEx J | — | 19.0 | 64.0 | — | — | — | — | — | 49.0 | SiO$_2$ |
| CEx K | 19.0 | — | 15.1 | 4.9 | 2.8 | — | — | — | — | SiO$_2$ |

For Exs 1-13 and CExs A-K, Table 2 provides catalyst composition performance at selected temperatures ranging from 270 to 360° C. The catalyst composition performance is determined by examining carbon atom selectivities against conversions, where "EtOH Selectivity" is the selectivity to ethanol, "p-ROH Selectivity" is the selectivity to prime alcohols, i.e., ethanol and n-propanol, "MeOH/ROH" is the ratio of methanol to alcohols, "p-ROH/HC" is the ratio of prime alcohols to hydrocarbons, and "CO$_2$ Selectivity" is the selectivity to carbon dioxide (CO$_2$). The Screening Method "A" is the reactor testing procedure described in Ex 1 and the Screening Method "B" is the reactor testing procedure described in Ex 8.

TABLE 2

| | Screening Method | Temp. (°C.) | CO Conversion (%) | EtOH Selectivity (%) | p-ROH Selectivity (%) | ROH Selectivity (%) | MeOH/ROH | p-ROH/HC | ROH Selectivity – HC Selectivity | HC Selectivity (%) | CO$_2$ Selectivity (%) |
|---|---|---|---|---|---|---|---|---|---|---|---|
| Ex 1 | A | 320 | 12 | 12 | 15 | 22 | 0.23 | 0.69 | 0 | 22 | 50 |
| Ex 1 | A | 340 | 21 | 11 | 14 | 19 | 0.19 | 0.57 | −5 | 24 | 51 |
| Ex 2 | A | 300 | 8 | 12 | 16 | 26 | 0.31 | 0.63 | 0 | 26 | 45 |
| Ex 2 | A | 320 | 13 | 11 | 15 | 23 | 0.30 | 0.54 | −4 | 27 | 46 |
| Ex 2 | A | 340 | 24 | 9 | 12 | 19 | 0.28 | 0.41 | −11 | 30 | 47 |
| Ex 3 | A | 300 | 6 | 9 | 12 | 18 | 0.26 | 0.53 | −5 | 23 | 51 |
| Ex 3 | A | 320 | 13 | 10 | 13 | 19 | 0.20 | 0.54 | −6 | 24 | 52 |
| Ex 3 | A | 340 | 26 | 9 | 12 | 17 | 0.17 | 0.47 | −10 | 27 | 51 |
| Ex 4 | A | 300 | 8 | 12 | 18 | 27 | 0.22 | 0.79 | 4 | 22 | 47 |
| Ex 4 | A | 320 | 14 | 11 | 17 | 25 | 0.21 | 0.69 | 1 | 24 | 46 |
| Ex 4 | A | 340 | 25 | 10 | 14 | 21 | 0.20 | 0.53 | −6 | 27 | 47 |
| Ex 5 | A | 300 | 8 | 12 | 17 | 31 | 0.42 | 0.67 | 7 | 25 | 41 |
| Ex 5 | A | 320 | 13 | 11 | 15 | 26 | 0.38 | 0.55 | −1 | 27 | 44 |
| Ex 5 | A | 340 | 22 | 9 | 12 | 20 | 0.34 | 0.40 | −10 | 30 | 46 |
| Ex 6 | A | 270 | 5 | 13 | 17 | 37 | 0.52 | 0.48 | 3 | 34 | 26 |
| Ex 6 | A | 300 | 14 | 9 | 13 | 26 | 0.47 | 0.39 | −6 | 32 | 39 |
| Ex 6 | A | 320 | 21 | 8 | 11 | 21 | 0.44 | 0.32 | −12 | 33 | 43 |
| Ex 6 | A | 340 | 32 | 5 | 8 | 14 | 0.41 | 0.22 | −22 | 36 | 47 |
| Ex 7 | A | 300 | 5 | 13 | 18 | 33 | 0.39 | 0.75 | 9 | 24 | 40 |
| Ex 7 | A | 320 | 9 | 12 | 16 | 29 | 0.37 | 0.63 | 3 | 26 | 42 |
| Ex 7 | A | 340 | 16 | 10 | 14 | 24 | 0.35 | 0.48 | −6 | 29 | 43 |
| Ex 8 | B | 270 | 5 | 12 | 17 | 41 | 0.51 | 0.41 | 0 | 41 | 17 |
| Ex 8 | B | 300 | 15 | 9 | 12 | 31 | 0.51 | 0.29 | −11 | 41 | 28 |
| Ex 8 | B | 320 | 24 | 6 | 8 | 20 | 0.55 | 0.18 | −24 | 45 | 35 |
| Ex 8 | B | 340 | 40 | 3 | 4 | 10 | 0.56 | 0.08 | −37 | 48 | 42 |
| Ex 9 | B | 270 | 3 | 14 | 20 | 43 | 0.45 | 0.72 | 16 | 28 | 28 |
| Ex 9 | B | 300 | 8 | 12 | 17 | 35 | 0.42 | 0.59 | 6 | 29 | 35 |
| Ex 9 | B | 320 | 17 | 10 | 15 | 28 | 0.38 | 0.49 | −2 | 30 | 41 |
| Ex 9 | B | 340 | 27 | 9 | 12 | 22 | 0.35 | 0.38 | −10 | 33 | 44 |
| Ex 10 | B | 270 | 8 | 7 | 10 | 22 | 0.19 | 0.54 | 4 | 18 | 59 |
| Ex 10 | B | 300 | 20 | 9 | 13 | 21 | 0.14 | 0.65 | 1 | 21 | 57 |
| Ex 10 | B | 320 | 36 | 13 | 20 | 31 | 0.12 | 0.93 | 9 | 21 | 47 |
| Ex 11 | B | 270 | 8 | 13 | 19 | 40 | 0.40 | 0.99 | 21 | 20 | 38 |
| Ex 11 | B | 300 | 21 | 12 | 18 | 33 | 0.33 | 0.77 | 10 | 23 | 42 |
| Ex 11 | B | 320 | 29 | 10 | 15 | 27 | 0.32 | 0.55 | 0 | 27 | 45 |
| Ex 11 | B | 340 | 47 | 6 | 10 | 18 | 0.27 | 0.30 | −16 | 34 | 48 |
| Ex 12 | B | 270 | 1 | 0 | 2 | 17 | 0.69 | 0.06 | −20 | 37 | 41 |
| Ex 12 | B | 300 | 1 | 0 | 1 | 11 | 0.87 | 0.01 | −28 | 39 | 49 |
| Ex 12 | B | 320 | 2 | 0 | 0 | 9 | 0.90 | 0.01 | −32 | 41 | 50 |
| Ex 12 | B | 340 | 4 | 0 | 0 | 7 | 0.90 | 0.01 | −36 | 43 | 50 |
| Ex 12 | B | 360 | 10 | 0 | 0 | 5 | 0.89 | 0.01 | −41 | 46 | 50 |
| Ex 13 | B | 270 | 3 | 11 | 15 | 38 | 0.53 | 0.60 | 12 | 26 | 34 |

TABLE 2-continued

| | Screening Method | Temp. (° C.) | CO Conversion (%) | EtOH Selectivity (%) | p-ROH Selectivity (%) | ROH Selectivity (%) | MeOH/ROH | p-ROH/HC | ROH Selectivity – HC Selectivity | HC Selectivity (%) | $CO_2$ Selectivity (%) |
|---|---|---|---|---|---|---|---|---|---|---|---|
| Ex 13 | B | 300 | 6 | 10 | 14 | 32 | 0.51 | 0.49 | 4 | 28 | 37 |
| Ex 13 | B | 320 | 11 | 9 | 12 | 28 | 0.49 | 0.41 | −3 | 30 | 40 |
| Ex 13 | B | 340 | 26 | 7 | 10 | 20 | 0.42 | 0.29 | −15 | 35 | 45 |
| CEx A | A | 320 | 0 | — | — | — | — | — | — | — | — |
| CEx A | A | 340 | 0.1 | — | — | — | — | — | — | — | — |
| CEx B | B | 270 | 10 | 12 | 16 | 39 | 0.51 | 0.44 | 1 | 37 | 23 |
| CEx B | B | 300 | 25 | 7 | 10 | 23 | 0.49 | 0.24 | −18 | 41 | 36 |
| CEx B | B | 320 | 47 | 3 | 5 | 11 | 0.49 | 0.11 | −33 | 44 | 44 |
| CEx C | B | 320 | 1 | 0 | 2 | 22 | 0.88 | 0.07 | −10 | 33 | 45 |
| CEx C | B | 340 | 1 | 2 | 4 | 18 | 0.73 | 0.1 | −21 | 39 | 42 |
| CEx C | B | 360 | 2 | 3 | 5 | 19 | 0.63 | 0.14 | −19 | 38 | 43 |
| CEx D | B | 300 | 6 | 2 | 4 | 15 | 0.33 | 0.12 | −17 | 32 | 53 |
| CEx D | B | 320 | 12 | 2 | 3 | 12 | 0.26 | 0.09 | −22 | 34 | 54 |
| CEx D | B | 340 | 17 | 1 | 2 | 8 | 0.21 | 0.05 | −29 | 37 | 54 |
| CEx D | B | 360 | 22 | 1 | 1 | 6 | 0.17 | 0.03 | −35 | 41 | 52 |
| CEx E | B | 300 | 5 | 9 | 12 | 21 | 0.27 | 0.39 | −9 | 31 | 48 |
| CEx E | B | 320 | 9 | 10 | 13 | 21 | 0.24 | 0.44 | −9 | 30 | 48 |
| CEx E | B | 340 | 14 | 10 | 13 | 21 | 0.21 | 0.44 | −9 | 30 | 49 |
| CEx E | B | 360 | 20 | 9 | 13 | 20 | 0.19 | 0.42 | −11 | 31 | 49 |
| CEx F | B | 320 | 1 | 12 | 16 | 34 | 0.43 | 0.64 | 8 | 26 | 40 |
| CEx F | B | 340 | 3 | 12 | 17 | 36 | 0.45 | 0.63 | 9 | 26 | 37 |
| CEx F | B | 360 | 7 | 10 | 14 | 29 | 0.43 | 0.47 | 0 | 30 | 40 |
| CEx G | B | 320 | 2 | 13 | 17 | 34 | 0.4 | 0.65 | 7 | 26 | 40 |
| CEx G | B | 340 | 4 | 12 | 16 | 33 | 0.42 | 0.6 | 7 | 27 | 40 |
| CEx G | B | 360 | 8 | 10 | 14 | 28 | 0.42 | 0.46 | −1 | 30 | 41 |
| CEx H | B | 270 | 9 | 10 | 14 | 37 | 0.53 | 0.57 | 11 | 25 | 37 |
| CEx H | B | 300 | 12 | 8 | 12 | 30 | 0.47 | 0.42 | 1 | 29 | 41 |
| CEx H | B | 320 | 19 | 6 | 9 | 22 | 0.48 | 0.27 | −11 | 33 | 44 |
| CEx H | B | 340 | 36 | 2 | 3 | 9 | 0.5 | 0.08 | −33 | 42 | 49 |
| CEx I | B | 270 | 23 | 9 | 14 | 31 | 0.45 | 0.4 | −4 | 35 | 34 |
| CEx I | B | 300 | 15 | 9 | 13 | 31 | 0.49 | 0.36 | −6 | 36 | 33 |
| CEx I | B | 320 | 29 | 5 | 8 | 19 | 0.51 | 0.19 | −22 | 40 | 41 |
| CEx I | B | 340 | 51 | 2 | 3 | 8 | 0.55 | 0.06 | −37 | 45 | 47 |
| CEx J | B | 300 | 4 | 12 | 17 | 40 | 0.37 | 0.76 | 18 | 23 | 36 |
| CEx J | B | 320 | 7 | 11 | 15 | 38 | 0.37 | 0.67 | 15 | 23 | 39 |
| CEx J | B | 340 | 11 | 10 | 14 | 33 | 0.38 | 0.54 | 7 | 26 | 40 |
| CEx J | B | 360 | 16 | 9 | 14 | 29 | 0.37 | 0.46 | −2 | 30 | 40 |
| CEx K | B | 270 | 1.4 | 15 | 18 | 64 | 0.71 | 1.17 | 48 | 16 | 9 |
| CEx K | B | 300 | 3.7 | 17 | 20 | 54 | 0.63 | 0.92 | 33 | 21 | 13 |
| CEx K | B | 320 | 5.1 | 16 | 19 | 48 | 0.61 | 0.75 | 24 | 25 | 16 |
| CEx K | B | 340 | 6.2 | 15 | 17 | 42 | 0.60 | 0.59 | 14 | 28 | 20 |

Table 3 provides estimates of performance for Exs 1-13 and CExs A-K at CO conversions of 15%, 25% and 35%. These estimates are determined by numerical interpolation using the equation listed below, where the intercept and slope parameters are obtained by linear fits of the data listed in Table 2.

ROH Selectivity–HC Selectivity=intercept+slope× (CO conversion)

Here, "ROH Selectivity" is the sum of the carbon atom selectivities of the various alcohols, "HC Selectivity" is the sum of the carbon atom selectivities of the various hydrocarbons and "ROH Selectivity–HC Selectivity" is the difference between these two selectivities. The catalyst compositions can be ranked according to the estimated value of ROH Selectivity-HC Selectivity at a fixed CO conversion, as listed in Table 3. Table 3 also lists "Maximum CO Conversion" which is the maximum total amount of CO that was converted at any particular temperature reported in Table 2.

TABLE 3

| | Maximum CO Conversion (%) | ROH Selectivity – HC Selectivity at 15% CO Conversion | ROH Selectivity – HC Selectivity at 25% CO Conversion | ROH Selectivity – HC Selectivity at 35% CO Conversion | Slope | Intercept |
|---|---|---|---|---|---|---|
| Ex 1 | 21.0 | −1.9 | — | — | −0.58 | 6.9 |
| Ex 2 | 24.0 | −4.7 | −11.7 | — | −.70 | 5.8 |
| Ex 3 | 26.0 | −6.7 | −9.1 | — | −.24 | −3.1 |
| Ex 4 | 25.0 | — | −6.3 | — | −.63 | 9.4 |
| Ex 5 | 22.0 | −1.8 | −12.9 | — | −1.11 | 14.8 |
| Ex 6 | 32.0 | −6.8 | −15.8 | — | −.90 | 6..7 |
| Ex 7 | 16.0 | −4.6 | — | — | −1.31 | 15.1 |
| Ex 8 | 40.0 | −11.6 | −22.5 | −33.3 | −1.08 | 4.6 |
| Ex 9 | 27.0 | 1.2 | −9.2 | — | −1.04 | 16.8 |
| Ex 10 | 36.0 | 3.1 | 5.3 | 7.6 | 0.22 | −0.2 |
| Ex 11 | 47.0 | 14.3 | 4.8 | −4.6 | −1.51 | 28.4 |
| Ex 12 | 10.0 | — | −13 | — | −1.90 | −24.5 |
| Ex 13 | 26.0 | −4.4 | — | — | −1.12 | 12.4 |

TABLE 3-continued

|  | Maximum CO Conversion (%) | ROH Selectivity – HC Selectivity at 15% CO Conversion | ROH Selectivity – HC Selectivity at 25% CO Conversion | ROH Selectivity – HC Selectivity at 35% CO Conversion | Slope | Intercept |
|---|---|---|---|---|---|---|
| CEx A | 0.1 | — | — | — | — | — |
| CEx B | 47.0 | −5.2 | −14.3 | −23.3 | −.91 | 8.4 |
| CEx C | 2.0 | — | — | — | −4.27 | −11.4 |
| CEx D | 22.0 | −27 | — | — | −1.12 | −10.2 |
| CEx E | 20.0 | −9.9 | — | — | −0.12 | −8.0 |
| CEx F | 7.0 | — | — | — | −1.68 | 12.4 |
| CEx G | 8.0 | — | — | — | −1.35 | 10.7 |
| CEx H | 36.0 | −1.8 | −16.9 | −32.1 | −1.51 | 20.9 |
| CEx I | 51.0 | −3.5 | −13.0 | −22.5 | −.95 | 10.8 |
| CEx J | 16.0 | 0.4 | — | — | −1.59 | 24.3 |
| CEx K | 6.2 | — | — | — | −6.78 | 57.4 |

Tables 2 and 3 show that catalyst compositions not including Ir (CEx A and C) give a CO conversion of 2% or less. Exs 10 and 11 outperformed CExs A-J at all three levels of CO conversion. For the Rh-based catalyst of CEx K, the CO conversion reached only 6% at a reaction temperature of 340° C., whereas Ex 10-11 exceeded 35% CO conversion at a reaction temperature of 340° C. The performance of CEx K at 340° C. (17% p-ROH at 6% conversion) is similar to that of Example 11 at 270° C. (19% p-ROH at 8% conversion).

The results presented in Tables 2-3 demonstrate that the catalyst compositions including a catalytic metal combination of V, Ir, and Mo convert syngas to prime alcohols more effectively than other combinations. For example, at 25% CO conversion or greater, the p-ROH selectivity of CExs B, H, I and K are lower than the p-ROH selectivity of Exs 3, 4, 9, 10, 11 and 13. CExs B, H, I and K have CO conversions within a range of from 25% to 51% with corresponding p-ROH selectivities within a range of from 3 to 10%, with only CEx B reaching 10%. In contrast, Exs 3, 4, 9, 10, 11 and 13 have CO conversions within a range of from 25% to 47% with corresponding p-ROH selectivities within a range of from 10% to 20%.

What is claimed is:

1. A catalyst composition for producing mixed alcohols consisting of a catalytic metal combination on a catalyst support, a first promoter and a second promoter, wherein the catalytic metal combination consists of iridium, vanadium, and molybdenum, and the first promoter is selected from the group consisting of zirconium, rhenium, palladium, hafnium, manganese and combinations thereof, and the second promoter is selected from the group consisting of potassium, lithium, sodium, rubidium, cesium and combinations thereof.

2. The composition of claim 1, wherein the catalytic metal combination includes iridium in an amount within a range of from 1 millimoles per hectogram to 65 millimoles per hectogram, vanadium in an amount within a range of from 2 millimoles per hectogram to 80 millimoles per hectogram, and molybdenum in an amount within a range of from 3 millimoles per hectogram to 85 millimoles per hectogram, each millimole per hectogram based on a mass of the catalyst support prior to the addition of the catalytic metal combination, the first promoter, and the second promoter.

3. The composition of claim 1, wherein the first promoter includes at least one of zirconium in an amount within a range of from 2.0 per hectogram to 80.0 millimoles per hectogram, rhenium in an amount within a range of from 2.0 millimoles per hectogram to 80.0 millimoles per hectogram, and palladium in an amount within a range of from 0.2 millimoles per hectogram to 5.0 millimoles per hectogram, each millimole per hectogram based on the mass of catalyst support prior to the addition of the catalytic metal combination, the first promoter, and the second promoter.

4. The composition of claim 1, wherein the second promoter includes potassium in an amount within a range of from 1 millimoles per hectogram to 500 millimoles per hectogram, each millimole per hectogram based on the mass of catalyst support prior to the addition of the catalytic metal combination, the first promoter, and the second promoter.

5. The composition of claim 1, wherein the catalyst support is selected from the group consisting of alpha-alumina, gamma-alumina, delta-alumina, magnesium oxide, magnesium silicates, magnesium aluminates, magnesia, silica gel, zirconia, zinc oxide, titania, ceria, niobium pentaoxide, or neodymium oxide and combinations thereof.

* * * * *